Bolles & Knight,
Stone Drill.
N° 6,417. Patented May 1, 1849.
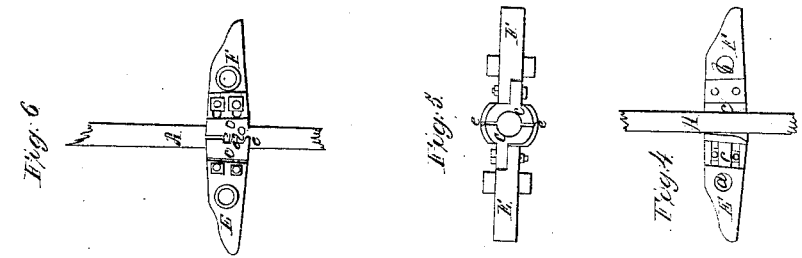
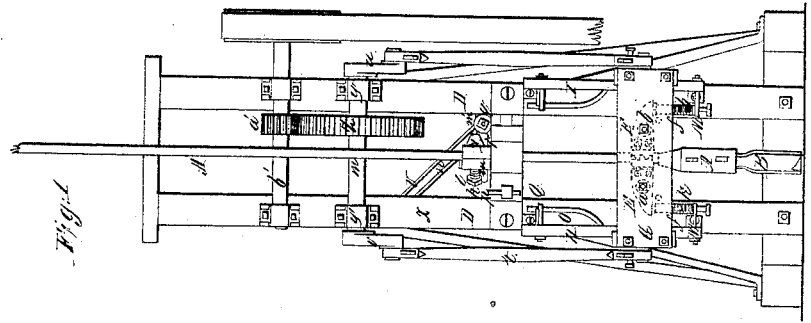
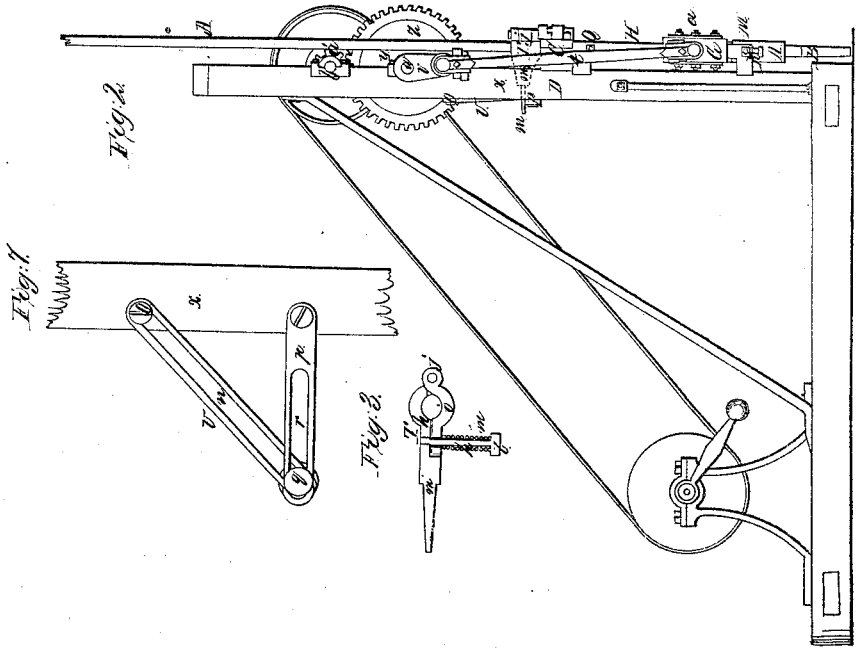

UNITED STATES PATENT OFFICE.

J. N. BOLLES, OF PROVIDENCE, RHODE ISLAND, AND H. G. KNIGHT, OF BOSTON, MASSACHUSETTS.

METHOD OF TURNING THE DRILL IN ROCK-DRILLING MACHINES.

Specification of Letters Patent No. 6,417, dated May 1, 1849.

*To all whom it may concern:*

Be it known that we, JESSE N. BOLLES, of Providence, in the county of Providence and State of Rhode Island, and HENRY G. KNIGHT, of Boston, in the county of Suffolk and State of Massachusetts, have invented a new and useful Machine for Either Drilling Rocks, Stamping Ores, or Such other Purposes to which the Same may be Applicable; and we do hereby declare that the same is fully described and represented in the following specification and accompanying drawings, letters, figures, and references thereof.

Of the said drawings Figure 1, denotes a front elevation of our said machine. Fig. 2, is a side elevation of it. Fig. 3 is a horizontal and longitudinal section of the clamp arm by the aid of which the drill is turned or revolved. Fig. 4, is a vertical section of part of the drill shaft, and the gripping levers by which it is grasped while being elevated.

In the said drawings A, represents a long cylindrical bar or drill shaft, which is enlarged or weighted at its lower end, and has the drill B, affixed to it. The said drill shaft slides freely up and down through and is partially supported by a bearing or box C, fastened to the front of the gin or frame work D, by which the operative parts of the mechanism to be hereinafter described are sustained.

The drill shaft extends and plays between two grippers or jaw levers E, F, represented in Fig. 1, by red lines. They are also shown in top view in Fig. 5, and in side view in Fig. 6. The said gripping levers are supported within and by a sliding frame G, which is applied to vertical and parallel guides or bars H, I, so as to be capable of being freely slid or moved up and down in a vertical direction. Each of the said levers E, F, moves on a fulcrum or pin, *a*, or *b*, arranged as seen in the drawings. The inner end of each lever or that nearest the drill shaft has a jaw *c*, affixed to it. The said jaw is hollowed out and rests against the drill shaft. Besides the same it is provided with a segment or short arc of two or more cogs or teeth *e*, *e*, the two arcs or segments of the two jaws being made to engage with one another in the same manner in which the teeth of two gear wheels are made to conjoin or interlock.

When the sliding frame G, is depressed to its lowest position, the extreme or outer arms of the levers E, F, are carried respectively into contact or down upon two spring studs or stop bolts K, L, and so as to cause the levers to close the jaws firmly against the drill shaft. The said stop bolts K, L, are firmly supported on, and pass through springs *f*, *f*, which rest on projections M M, extended from either the frame or the slide bars before mentioned. For opening the said jaws two cam or bent bars O, P, are employed, they being fastened to stationary projections Q, R, and made to extend downward therefrom, all as seen in Fig. 1. They are to be so placed that when the sliding frame G, has been elevated sufficiently to raise the drill to the height required, the outer arms of the gripping levers will have been forced against them, sufficiently to cause the jaws to move and release the drill shaft, and in such manner as to permit it to freely fall downward.

The apparatus or mechanism by which the rotation of the drill or drill shaft is effected may be thus described. A clasp T, constructed of two parts or jaws *h*, *i*, hinged together as seen at *j*, is formed and placed on the drill shaft, as seen in Figs. 2 and 3. From one of these viz, *h*, a pin *k*, extends, and passes through the other jaw as seen in Fig. 3. Between the head *l* of the pin *k*, and the jaw *i*, a helical spring *m*, is placed on the pin, one end of the spring being made to rest against the said head, while the other bears against the jaw *i*, in such manner as to close the jaws against and upon the drill shaft, and with a degree of friction or hold on the same, which will allow of the jaws turning on the shaft, while said shaft is grasped by the gripping jaws *c*, *c*. This friction should also be such as to enable the clasp T, to adhere sufficiently to the drill shaft, as to enable it to be rotated by mechanism to be hereinafter described, and while the drill is in the act of descending. From the jaw *h*, of the clasp T, an arm *m'*, extends rearward through an inclined slot *n*, made in or through a plate V, a rear side view of which, showing the manner in which it is supported or connected with the post *x* of the main frame is shown in Fig. 7. The upper end of this slotted plate is confined to one of the posts *x*, by a clamping screw *o*, which passes through the slot of the plate. The lower end of the plate is also connected to a horizontal slotted plate $p$, by a clamping screw $q$, which passes through the slot of the plate V, and the slot $r$, of the plate $p$. By means of such contrivances the slot $n$, or plate V, may be adjusted to any suitable inclination to the horizon and so as to impart to the drill shaft such a degree of rotary motion as it may be desirable within certain limits.

While the drill shaft is in the act of ascending the slot, it is so firmly held by the jaws $c, c$, that it cannot be rotated. During this time however the inclined slot $n$, so acts on the arm $m'$, of the clasp T, as to turn or partially rotate the clasp on the drill shaft. When the drill shaft has been relieved from the grasp of the jaws $c, c$, and while it is in the act of descending, the said slot $n$, so acts on the arm $m'$, while it passes through it, as to turn or partially rotate the drill shaft, this taking place at every downward movement of the drill.

For the purpose of elevating the frame G, it has two connecting rods $s, t$, jointed to it. These rods are arranged as seen in Figs. 1, and 2, and are respectively jointed at their upper ends to two cranks $u, v$, extended from a horizontal shaft $w$, which is supported and turns in boxes $y, y$. Said shaft $w$, has a cogged wheel $z$, fixed upon it, the said wheel being made to engage with a gear or pinion $a$; fixed on a shaft $b'$, which is revolved or put in motion by a steam engine or any other proper motion suitably applied.

We claim—

The combination of the slotted plate and the friction clasp and its arm as applied to the drill shaft and main frame, and made to operate in connection with the elevating jaws $c, c$, substantially in the manner, and for the purpose of rotating the drill as specified.

In testimony whereof we have hereto set our signatures this fourteenth day of February A. D. 1849.

JESSE N. BOLLES.
        HENRY G. KNIGHT.

Witnesses:
  SAMUEL W. BROWN,
  BARZILLIA CRANSTON.